INVENTORS
ERNST PETSCH
ALBERT HERTL

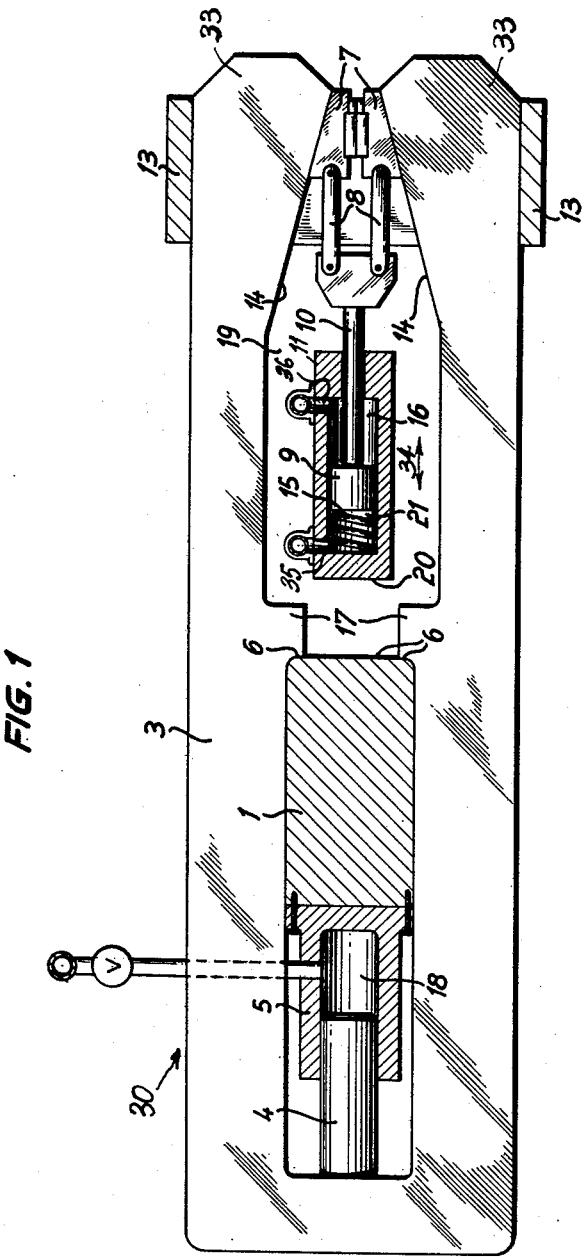
INVENTORS:
ERNST PETSCH
ALBERT HERTL

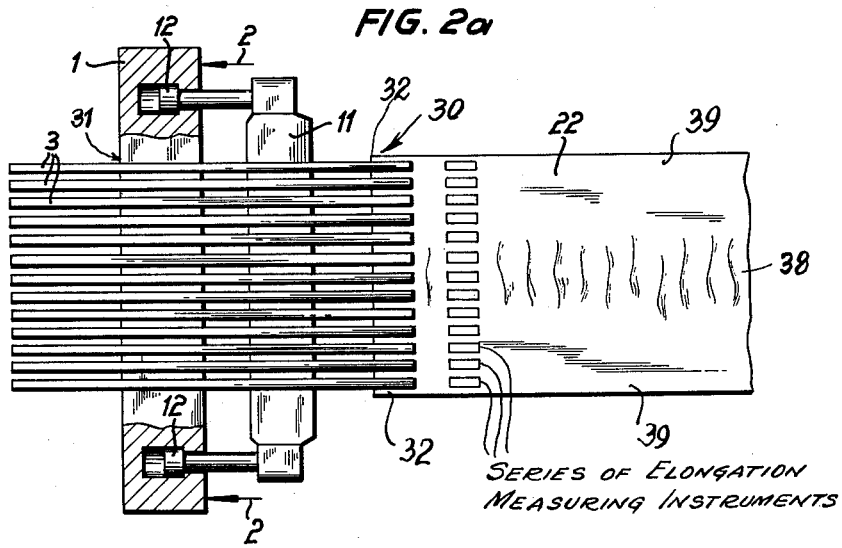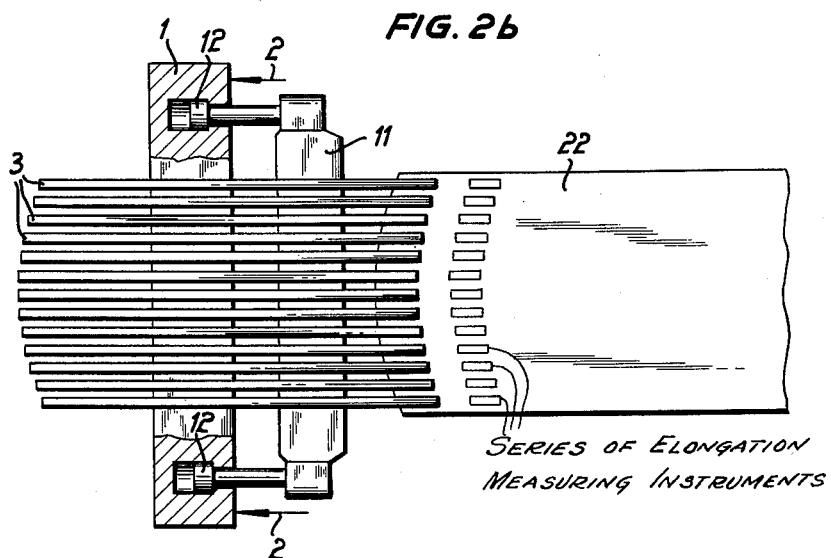

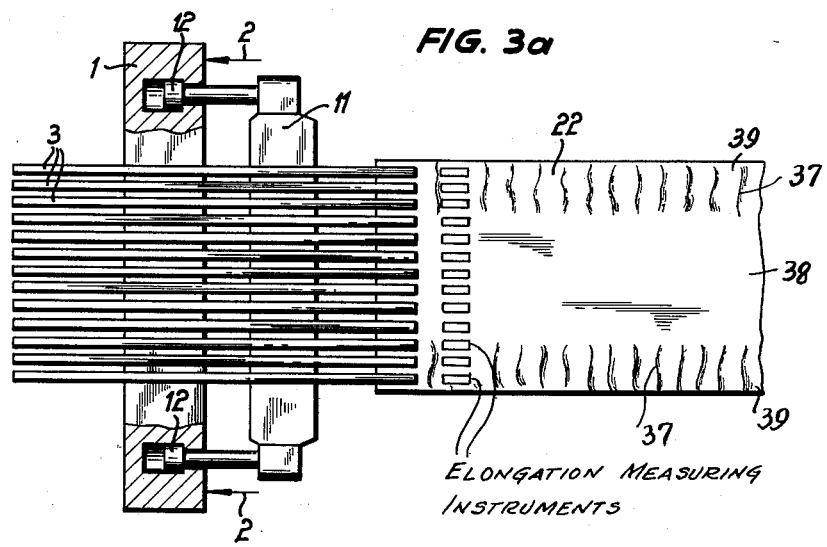
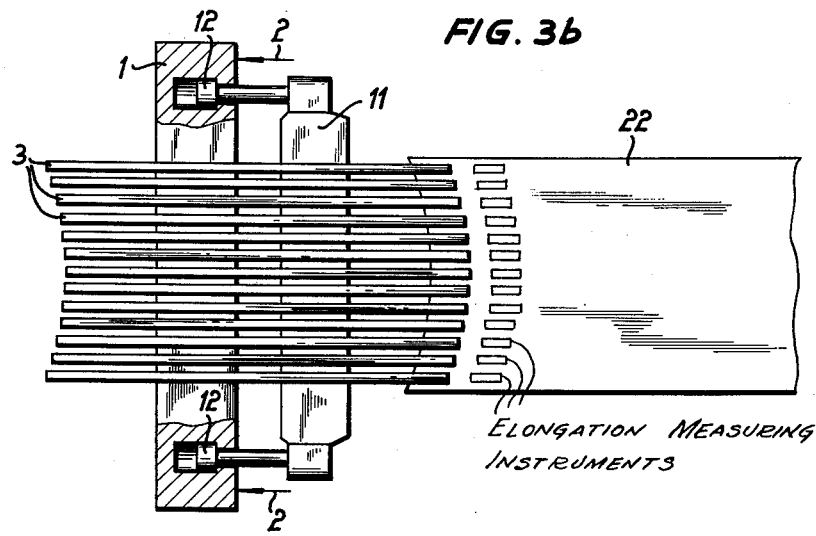

United States Patent Office 3,082,809
Patented Mar. 26, 1963

3,082,809
METHOD AND MEANS FOR STRETCHING UNDULATED SHEET MATERIAL AND LIKE WORKPIECES
Ernst Petsch and Albert Hertl, Duisburg, Germany, assignors to Hydraulik G.m.b.H., Duisburg, Germany
Filed Nov. 25, 1959, Ser. No. 855,465
Claims priority, application Germany Nov. 28, 1958
20 Claims. (Cl. 153—35)

The present invention relates generally to stretching of workpieces, such as sheet material parts or members having local undulations or wavy surfaces which are irregularly distributed and concerns more particularly a process for effecting stretching operations by means of a stretching machine equipped with chuck means for gripping said sheet material members to be stretched.

It is an object of the present invention to provide means avoiding overstretching of the workpiece in the course of stretching operations and obtaining a substantially uniform stress distribution over the entire width of the workpiece or sheet material member under treatment.

Before the start of any stretching operation, the elongated member to be stretched is chucked at opposite ends by means of chuck devices arranged on two aligned draw heads. The chuck devices consist of a number of juxtaposed clamping members distributed over the width of the member to be stretched and which adapt themselves independently of each other to irregular or non-uniform thicknesses of the workpiece.

The two heads, which are provided with hydraulic drives, are moved apart for the stretching operation to produce tensile stresses in the workpiece being stretched. The reaction forces of the clamping members are absorbed over traverse members which extend over the entire width of the workpiece and on which the individual clamping members are mounted. Such a stretch by traverse members, abutting on both sides of the workpiece to be stretched, causes bending up in the center under the tensile stress. This results in a lesser elongation in the center zone than in the edge zones of the workpiece.

According to a prior art arrangement, a correction of the setting could be effected on the juxtaposed clamping members to the extent of the varying elongation, in order to achieve a uniform stretching over the entire width of the workpiece. The concept of the present invention is quite different. The present invention relates to the equalization of the varying stretch forces acting on the workpiece due to the differences in length of the workpiece to be stretched caused by local undulation. It is another object of the present invention to provide means assuring a uniform stretching of the workpiece, independently of the differences in the length thereof.

The process according to the invention results from the subdivision of prior art clamping jaws, into a plurality of juxtaposed clamping members which are distributed over the entire width of the sheet member. It is particularly advantageous to use a very fine subdivision into a substantially large number of relatively narrow chuck elements in order to come as close as possible to a continuous adaptation of the chuck means to the local differences in the length of the sheet.

The adaptation of the individual chuck elements to the different stress conditions within the workpiece, caused by local differences in length, is made possible by an infinitely variable flexibility of the chuck elements within the draw head.

At the start of the stretching operation the chuck elements extend in a straight line parallel to the chucked edge of the workpiece by abutting on a fixed stop of the draw head. The individual chuck elements are so constructed that each pair of jaws, responsive to a pair of chuck elements, abuts on the sheet surface during the chucking operation, over the entire sheet width, independently of local differences in the thickness of the sheet.

When the sheet member to be stretched is chucked, the stretching process is initiated by the two draw heads, which are connected to the respective chucking elements at the opposite ends of the sheet, moving away from each other to impart to the sheet a longitudinal stress. Due to the differences in the length of the sheet, caused by local undulations or waves therein, locally different tensile forces are created during the stretching process, the tensile forces being highest in those zones or areas of the sheet which have the least undulation.

An important feature of the method of the present invention resides in the very fine-graded or close distribution of elongation meters over the entire width of the workpiece or sheet member to thereby continuously indicate, during the entire duration of the stretching process, corresponding values of stresses appearing in the various stretching zones of the workpiece. It is preferable to assign an elongation meter to each chucking element.

According to another feature of the invention each of these meters is connected, by means of a regulating or control device, with its associated chucking element, influencing its flexibility in the direction of stretch to the extent of the measured tensile stress. When the highest stresses appear in the zones with the lowest undulation, the associated chucking elements are influenced by means of the regulating devices, controlled by the measured readings of the elongation meters in the direction of stretch, to vary the degree of great flexibility so that the peak stresses are reduced.

It is another feature of the invention to provide control means so constructed, that the stretch zone with the greatest undulation, which has the lowest or minimum stress, represents the lower limit to which all other stretch zones adapt themselves. If the elongation meter indicating the lowest stress values is set as the utmost limiting measure for influencing all chuck elements, the result is a completely independent and fully continuous process for stretching the sheet members. After the workpiece is released, the original rectilinear contour of the chucked edges will have changed to a more or less curved contour.

For carrying out the process of the present invention, the chuck-devices are divided into a substantially large number of relatively narrow juxtaposed chuck elements which extend over the entire width of the sheet to be stretched so as to permit a substantially infinite adaptation to the local differences in the length of the sheet being stretched. The common support for the chuck device, on which the various chuck elements are arranged, is the stretch traverse member extending over the entire stretch width. It can be moved in the direction of stretch in order to effect the stretching operation. Since the traverse member has to absorb all the stretching forces, it is constructed as a substantially bend-resistant body with regard to the stretching plane.

Equal pulling forces of all the clamping jaws or chuck elements across the entire width of the workpiece to be stretched could also be obtained by providing (instead of individual elongation measuring means) a common pressure compensation conduit connected with all the cylinders of the stretch traverse member with which the pistons of the chucks are operatively connected.

The individual chuck elements comprise preferably U-shaped chuck jaws and embrace three sides of the stretch traverse member and which are longitudinally displaceable relative to the latter. The longitudinal displaceability of the chuck claws or jaws relative to the traverse member is preferably effected by hydraulic drive means.

The chuck jaws are provided with a detent which limits their motion relative to the traverse stretch member in the direction opposite to the tensile stress.

In the starting position the detents of the chuck jaws abut the traverse stretch member and are therefore aligned exactly parallel to the traverse member.

The chuck jaws are provided at their front open end with opposing obliquely converging supporting surfaces on which wedge-shaped pairs of clamping jaws can be displaced so that they can be adapted to the respective sheet thickness. The displacement of the clamping jaws is effected by guide rods which are adjusted over the frog of a preferably hydraulic drive. All individual driving units for all pairs of clamping jaws of a chuck device are arranged in a continuous common clamping traverse member extending parallel to the stretch traverse member.

The clamping traverse member is provided also with a separate drive, acting opposite the associated stretch traverse member, which preferably comprises pistons operating in hydraulic cylinders at both ends of the stretch traverse member. By means of this arrangement it is possible to make the clamping members, which are regularly distributed over the width of the sheet to be stretched, abut on the sheet faces to be chucked, independently of the sheet thickness, by displacing the clamping traverse member. Due to the flexibility of the pistons movable in their cylinders in the clamping traverse, and connected in each chuck with the clamping jaws, each pair of clamping jaws adapts itself automatically to the respective local sheet thickness.

The cylinder chambers of all pistons acting on the various pairs of clamping jaws within the clamping traverse member are connected with each other by means of a pressurized line and can simultaneously receive a pressurized medium. After the advance of the clamping traverse member relative to the stretch traverse member, which at first merely effects the abutment of the clamping jaws on the sheet surface to be chucked, all pistons moving individual clamping jaws are subjected within the clamping traverse to a pressurized medium, so that a completely uniform chucking of the workpiece to be stretched is achieved, independently of the thickness of the workpiece.

The position of the chuck claws relative to the stretch traverse member is not influenced by this process, because their detents still abut the stretch traverse member and extend parallel thereto, when the stretching operation starts. During the stretching operation stress peaks will appear in the undulated zones of the workpiece and are transmitted to the respective chuck jaws. These stress peaks are measured by each of the elongation meters assigned to the chuck jaws, so that the local position of these stress peaks is made visible.

Corresponding to the basic concept of the invention, the problem of reducing these stress peaks is solved in the manner that a corresponding amount of pressurized medium is withdrawn from the cylinders by means of whose pistons the chuck jaws are supported against the stretch traverse member. In this each pair of chuck jaws has the possibility of yielding in the direction of the stretching force with regard to the stretch traverse member, its detent moving away from the corresponding limiting edge of the stretch traverse member.

The advantage of this arrangement consists, according to the present invention, in that the chucking force of the clamping jaws remains unchanged at this yielding in the direction of stretch. The flexibility of the various chuck jaws against the stretch traverse member can be so controlled by regulating the amount of the pressure medium in the cylinders associated with the individual chuck jaws that a uniform distribution of the stresses is obtained over the entire width of the sheet.

Due to the slackening of the chucking elements of some zones, which show no undulation, or only a minor undulation, these lag behind the zones with a greater undulation, which results in a curved contour of the originally straight chucked edge of the stretched workpiece.

After the stretching operation is completed, the clamping jaws are opened by moving the respective pistons in the clamping traverse member in the direction of withdrawal, and returning the entire clamping traverse member by means of its driving device. Due to the withdrawal of the clamping jaws on their inclined supporting surfaces the jaws move apart, releasing the chucked member. In order to obtain the ready position for a new stretching operation, it is merely necessary to admit the pressure medium into all those cylinders by means of whose pistons the clamping jaws take support against the stretch traverse member. This way the clamping jaws are returned to their starting positions in which their detents abut the corresponding limiting edge of the stretch traverse.

These and other objects of the invention will become further apparent from the detailed description, reference being made to the accompanying drawings, showing preferred embodiments of the invention.

In the drawings which illustrate the presently preferred embodiments for carrying out the invention:

FIG. 1 shows a section through the chuck-device in the direction of stretch and perpendicular to the plane of the sheet member being stretched, and FIGS. 2a, 2b, 3a and 3b show parts of the chuck-device in top plan view and partially in section, in various operating positions.

Figure 4:
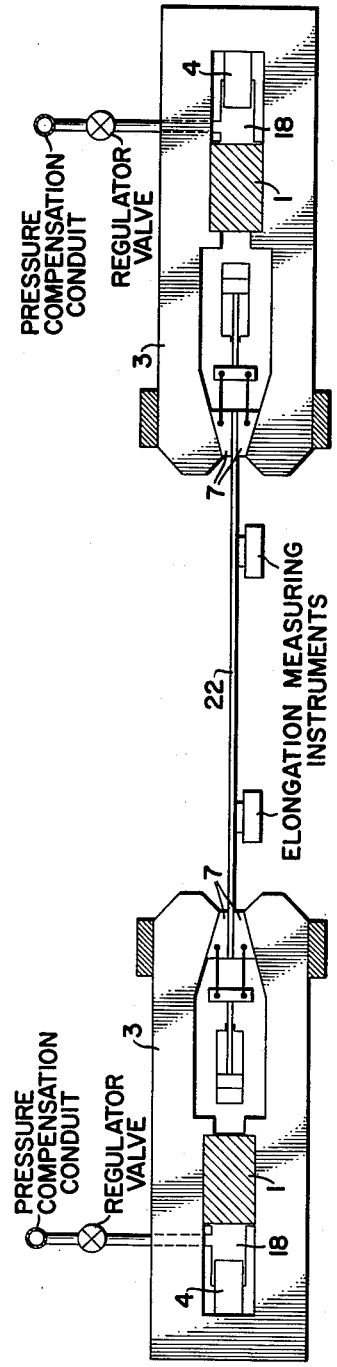
FIG. 4 is a schematic side elevational view (partly in section) of the stretching plant.

Referring now to the drawings in detail, there is shown a sheet member stretching mechanism 30 pursuant to the present invention. Said mechanism comprises a pair of draw heads 31 of which only one is shown. It will be understood that each draw head is similar in construction and clamps one end 32 of a sheet material member 22, which is to be stretched so that said member is clamped at opposite ends thereof. Suitable conventional mechanism (hydraulic, electromechanic, etc., not illustrated) is provided to move the draw heads in opposite directions for the stretching operation.

Each draw head 31 comprises a stretch traverse member 1 (FIG. 1) on which there is mounted for relative movement the U-shaped chuck claws or jaws 3 which are open at the front ends 33 thereof.

Each pair of jaws 3 abuts against the stretch traverse 1 by means of a piston 4 operable in a pressurized medium chamber 18 formed in a cylinder 5. Conventional means (not shown) are provided to introduce and exhaust a pressurized medium from each chamber 18. The pressure in each chamber 18 causes a projection or cam detent 17 of each chuck jaw 3 to abut against the limiting edges 6 of the stretch traverse member 1.

In chamber 19 defined in chuck jaws 3, there is movable a clamping traverse member 11 in longitudinal directions, as indicated by arrows 34. This clamping traverse member includes a cylinder 16 and a piston 9 therein, through which the pairs of clamping jaws 7, which can be displaced along inclined supporting surfaces 14 of the clamping jaws 3, may be actuated via piston rod 10 and guide links or bars 8. Bores 35 and 36 are provided in each cylinder 16 for introducing a pressurized medium therein, in a conventional manner, for operating the piston 9 in a direction, as desired.

The clamping traverse member 11 can be withdrawn so far toward traverse member 1 that its rear edge 20 abuts against the limiting edge 6 of said traverse member 1. In this case the pairs of clamping jaws 7 are in open position.

The pistons 9 are sprung against the cylinder bottoms 20 either mechanically by means of the springs 15 or hydraulically, and are retained in their central position by the pressurized medium in the cylinder chambers 16. The supporting beams 13, which prevent the clamping jaws from bending up, are provided to receive the chucking forces appearing traverse to the direction of stretch.

In the above-described position, with all chuck claws 3 and with the clamping traverse member 11 abutting the stretch traverse 1, the sheet member to be stretched is introduced into the chuck device. By means of the pistons 12 the clamping traverse member 11 is moved away from the stretch traverse 1 toward the sheet member 22 and opposite to the direction of stretch which is indicated by the arrow 2. The clamping jaws 7 are advanced by this motion over the pistons 9 and piston rods 10 as well as the guide rods 8, and close. Corresponding to the varying sheet thicknesses, the clamping jaws 7 complete the chucking stroke when they have reached the workpiece 22, independently of the stroke of the clamping traverse member 11, which is fixed once and for all. This is possible due to the flexibility of the various pistons 9 in the clamping traverse member 11, which are sprung against the cylinder bottom 20. This arrangement of the chucking elements assures that each pair of clamping jaws 7 will engage, even with major differences in thicknesses, over the entire width of the sheet.

The advance of the clamping traverse member 11 has at first only the result that all clamping jaws 7 come in contact with the workpiece to be chucked, without any clamping force being exerted. The clamping force is produced by the admission of the pressurized medium through inlet 35 of the cylinder chamber 21 behind the piston 9, by which means the pairs of clamping jaws 7 receive their chucking force over the piston 9, the piston rod 10 and the guide rods 8.

After the sheet member 22 to be stretched has been chucked, at both opposite ends 22, the stretching operation is started by moving the stretch traverses 1 in the direction of stretch (arrow 2) by means of suitable conventional mechanism (not illustrated). FIGS. 2a and 2b illustrate the stretching operation, according to the invention, when the sheet member to be stretched has local undulations 37 in the longitudinal center zone 38 thereof. After the sheet member 22 is chucked by moving the clamping traverse 11 opposite to the direction of stretch and closing the clamping jaws 7 under the pressure of the pressurized medium entering the chambers 21, the stretching process proper is produced by moving the stretch traverse member 1 in the direction of the arrow 2. Due to the local undulation of the sheet in the center zone, the stresses are here much lower, while stress peaks appear in the edge zones 39.

The stress peaks are indicated by meters which measure the elongation. These measurements are made continuously during the stretching operation. For this purpose, a conventional elongation meter (not illustrated) is connected to each chucking element 3. Suitable mechanism is provided, which includes a regulating means, which controls the pressure in chamber 18 in accordance with the measured tensile stress, so as to vary the amount of pressure in each chamber whereby to, in effect, vary the resiliency of each chucking element 3 relative to the stretch traverse member 1 to reduce the peak stresses. Such regulating or control mechanism is so effective that the stretch zone in the sheet member 22 with the greatest degree of undulation, which has the lowest stress, represents the lowest limit to which all the other stretch zones adapt themselves. The elongation meter which indicates the lowest stress value is set as the lowest limiting measure to influence all the chucking elements. After a first stretching stage, the various measurements are noted on the elongation meters and before the stretching process is continued, the clamping elements in the regions of maximum elongation are slackened by releasing part of the pressurized medium from the associated chamber 18 so that those zones in the sheet member 22, which are relieved of maximum stress, participate in the subsequent stretching operation with reduced tensile stress.

Thereafter a second measurement is taken of the distribution of tensile stresses over the width of sheet 22 and the new peak stresses which have developed are reduced. The operation is repeated until a substantial uniform distribution of tensile stress over the entire sheet width is obtained.

Therefore, by gradually slackening the clamping claws 3 in the region of the stress peaks in the edge zones, as in FIGS. 2a and 2b, a completely uniform stretching of the sheet plate 22 is achieved in the course of the further stretching operation, so that the clamping claws 3 assume, after the stretching operation, the position indicated in FIG. 2b.

FIGS. 3a and 3b show the course of the stretching operation when the local undulation 37 of the plates to be stretched appears merely in the edge zones 39, while the center zone 38, extending in longitudinal direction, is free of undulations. Here the peak stresses appear soon after the start of the stretching process in the region of the center zone, so that the clamping claws 3 must be slackened in this region gradually against the stretch traverse member 1. After the stretching operation is completed, the arrangement of the clamping claws 3 with regard to the stretch traverse 1 will assume the position shown in FIG. 3b.

Here too, a completely uniform stretching of the workpiece is achieved by slackening the clamping elements with the highest stress peaks, as previously described.

Various changes and modifications may be made without departing from the spirit and scope of the present invention and it is intended that these modifications and changes be embraced by the annexed claims.

Having thus described the invention, what is claimed as new and desired to be secured by Letters Patent is:

1. The method of stretching a locally undulated elongated sheet member on a stretching mechanism in which opposite edges of the sheet member are chucked for stretching; said method comprising the steps of subjecting said sheet member to stretching action thereafter measuring tensile stresses applied to adjacent stretching zones of the sheet member which appear at corresponding locations transversely of the plane of said elongated sheet member, thereafter reducing the stretching action at zones showing a maximum tensile stress while the sheet material is still undergoing the original stretching tension at all other locations across its width, resuming the stretching action, measuring thereafter for the second time the distribution of tensile stresses transversely of said sheet member, reducing the stretching action at zones then showing a maximum tensile stress, and finally repeating the foregoing steps until a substantially uniform distribution of tensile stresses is obtained over the entire area of the sheet member.

2. The method set forth in claim 1, including the step of clamping said sheet member over the entire width thereof in said mechanism, and conditioning the maximum tensile stresses by reducing the stretching actions at zones of maximum stress.

3. Means for stretching an undulated plate-shaped workpiece comprising a pair of opposed traverse stretch means adapted for uniform planar movement toward and away from the workpiece, a plurality of clamping elements mounted in juxtaposed relation to each other and for relative movement on each of said stretch means, resilient means operable between each clamping element and the essential traverse stretch means and constructed for adjusting the tensile stress of said workpiece being stretched between said opposed clamping elements of respective means.

4. Means according to claim 3, said resilient means each comprising a chamber, a piston operable in said chamber and located between each clamping element and said traverse means, means operable to provide access of a pressure medium on said piston, and means to vary the pressure exerted by said medium on each piston.

5. Means for applying stretching action to a workpiece comprising traverse stretch means, a plurality of laterally related clamping elements each including cooperating clamping jaws for gripping said workpiece and each mounted for relative movement on and relative to said stretch means, said elements being substantially U-shaped and encompassing said traverse means at three sides thereof, means for moving said clamping jaws of each clamping element and separate means for effecting longitudinal displacement of each of said elements relative to said traverse means.

6. Means as set forth in claim 5, each clamping element having a front end and being provided with spaced converging surfaces extending toward said front end, said clamping jaws including a pair of wedge-shaped jaws arranged for movement along converging surfaces for effectuating clamping said workpiece between said jaws, and means for operating and guiding said jaws along said surfaces.

7. Means as set forth in claim 5, each clamping element being provided at one end with converging surfaces, said clamping jaws including a pair of wedge-shaped jaws operable to move along said surfaces for clamping said workpiece between said jaws, and means for operating said jaws, said operating means being a hydraulic drive including a guide rod connected to each jaw and a piston rod operatively connected to said guide rods.

8. Means as set forth in claim 6, including traverse clamp means operatively connected to said traverse stretch means and displaceable in the stretching direction of said workpiece, all of said jaw operating means being provided in said traverse clamp means, and means for effecting movement of said clamp means relative to said stretch means.

9. Means as set forth in claim 8, said latter means being a hydraulic drive and comprising a piston mounted at each end of said clamp means and operable in an associated cylinder provided in said stretch means.

10. Means as set forth in claim 5, each clamping element being provided with converging surfaces at one end thereof, said clamping jaws including a pair of wedge-shaped jaws operable on said surfaces for clamping said workpiece therebetween, means for operating said jaws and including a hydraulic drive provided with a guide rod connected to each jaw and a piston rod operatively connected to said guide rods, each piston rod having a piston, a cylinder in which each piston is movable, and means in each cylinder normally positioning each piston centrally of its associated cylinder.

11. Means as set forth in claim 5, each clamping element being provided with surfaces converging toward one end of each element, said clamping jaws including a pair of wedge-shaped jaws operable on said surfaces for clamping said workpiece therebetween, pressure actuated drive means for operating said jaws, said pressure actuated means including a guide rod connected to each jaw, a piston rod centrally of and operatively connected to said guide rods, each piston rod having a piston, a cylinder in which each piston is movable, and means normally positioning each piston in its associated cylinder.

12. Means as set forth in claim 5, each clamping element being provided with guide surfaces converging toward one end thereof, said clamping jaws including a pair of wedge-shaped jaws operable on said surfaces for clamping said workpiece therebetween, and a drive for operating said jaws, said drive being a hydraulic drive and including a guide rod connected to each jaw, a piston rod operatively connected to said guide rods, each piston rod having a piston, a cylinder in which each piston is movable, and means normally positioning each piston centrally of its associated cylinder, said last-mentioned means being a spring at one side of said piston and further means for passage of a pressurized medium to the other side of said piston.

13. A mechanism for uniformly stretching a plate-shaped workpiece and like sheet material; comprising a series of pairs of oppositely arranged hollow draw heads, a first traverse means, a second traverse means spaced from said first traverse means, both said traverse means extending through and across said draw heads, means operatively interconnecting one of said traverse means to the other of said traverse means outside said draw heads, each of said draw heads terminating in an open end, converging wall surfaces extending from the hollow interior of each draw head toward its open end, a pair of jaw means shaped for movement along said converging wall surfaces toward and away from said open end of each draw head, means located within the interior of each draw head and operatively connected to one of said traverse means and to said jaws to move the latter toward and from said open ends of said draw heads, whereby an elongated plate-shaped workpiece may be gripped by and between said jaw means along opposed transverse edges defining said elongated workpiece without regard to the thickness of the latter, means for moving said interconnecting means so that said traverse means are caused to perform a relative movement toward and apart from each other, thereby to stretch said workpiece located between and gripped in said opposite draw heads, and means for controlling the tensile stress at longitudinal zones extending along said workpiece between corresponding opposite draw heads in order to determine the amount of stretch of said workpiece along said zones defined by said series of pairs of opposite draw heads.

14. A mechanism according to claim 13, including means located in the interior of said draw heads for limiting the relative movement of said first traverse means with respect to said second traverse means, said first traverse means forming stretch means, said second traverse means forming means for effectuating jaw means clamping action, said second traverse means including a piston, a piston rod interconnecting said piston with each pair of jaw means, a cylinder, in which said piston is movable, and means for directing a pressure medium in said cylinder for displacing said jaw means via said piston and piston rod.

15. A method of stretching workpieces such as sheet material to insure uniform stretch distribution over the entire width of the workpiece comprising gripping the sheet material at each end with uniform pressures at several points along its width, subjecting the workpiece to stretching action by moving the gripping means outwardly to apply gripping tension, employing means to measure while the workpiece is being gripped with gripping tension the tensile stresses at locations across the workpiece corresponding to the location of the clamping pressure points, adjusting the gripping tension at each of the clamping points so that the tension at each point corresponds to the gripping tension at the location of the measurement of the lowest tensile stress, and continuing the stretching of the workpiece under the adjusted gripping tension.

16. A clamping device for stretching workpieces of uniform tension applied across the workpiece comprising a transverse stretch member of a width substantially equal to the width of the workpiece being stretched, said stretch member adapted to be moved in a plane toward and away from the workpiece, a plurality of individual clamping elements disposed across said stretch member movable relatively to said stretch member, each including movable clamping jaws, means to move said jaws to open and close them and to vary their gripping force, and separate means connected to each of said clamping elements and to said stretch member to effect relative motion therebetween to vary the tension applied by the respective clamping element on the workpiece.

17. A clamping device according to claim 16, wherein said means connected to each of said clamping elements and to said stretch member includes a cylinder, a piston slidable in said cylinder, and means for conducting fluid pressure to said cylinder for effecting movement of said piston relative to said cylinder and movement of said clamping element relative to said stretch member.

18. A clamping device according to claim 16, wherein said clamping elements include a U-shaped member surrounding said stretch member and being relatively slidable in respect thereto said U-shaped member having legs with converging jaw walls said clamping jaws each having a gripping base and being disposed in opposition and movable on said jaw walls to cause opposed bases thereof to come together for gripping engagement.

19. A clamping device for stretching workpieces with uniform tension applied across the workpiece comprising a transverse stretch member of substantially the same width as the workpiece adapted to be moved in a plane toward and away from the workpiece, a plurality of substantially U-shaped clamping elements having leg portions fitting over said stretch member, said stretch member being slidable along said leg portion, piston and cylinder means disposed between said stretch member and a wall of said clamping elements, said clamping elements having clamping jaws between the leg portions thereof, means to move said clamping jaws to open and close them and to vary the gripping force of said jaws, and separate means to pressurize said piston and said cylinder means to cause relative movement of said piston and cylinder and displacement of said clamping elements relative to said stretch member for adjusting the gripping tension of the individual clamping elements.

20. A gripping device comprising a chuck having a pair of opposed converging jaw walls, a pair of jaw elements having gripping surfaces disposed in opposition for receiving material to be gripped therebetween and having outer surfaces complementary to said jaw walls and in sliding engagement therewith, a movable piston member connected to said jaws for sliding them relative to said jaw walls for closing and opening movement of said jaws and for regulating the gripping force of said jaws, means to bias said piston in a direction toward said jaws to urge said jaws to the converging end of said jaw walls and in a closing direction, separate means for moving said piston member to regulate the opening and closing of said jaws and the clamping force applied thereby, a stretch member, said chuck being slidable on said stretch member, and piston and cylinder means connected between said stretch member and said chuck for varying the relative position of said chuck in respect to said stretch member.

References Cited in the file of this patent

UNITED STATES PATENTS

| | | |
|---|---|---|
| 2,522,319 | Tinley | Sept. 12, 1950 |
| 2,852,062 | Lorant | Sept. 16, 1958 |
| 2,908,316 | Albers | Oct. 13, 1959 |

FOREIGN PATENTS

| | | |
|---|---|---|
| 801,888 | Great Britain | Sept. 24, 1958 |
| 810,683 | Great Britain | Mar. 18, 1959 |